United States Patent Office 3,439,738
Patented Apr. 22, 1969

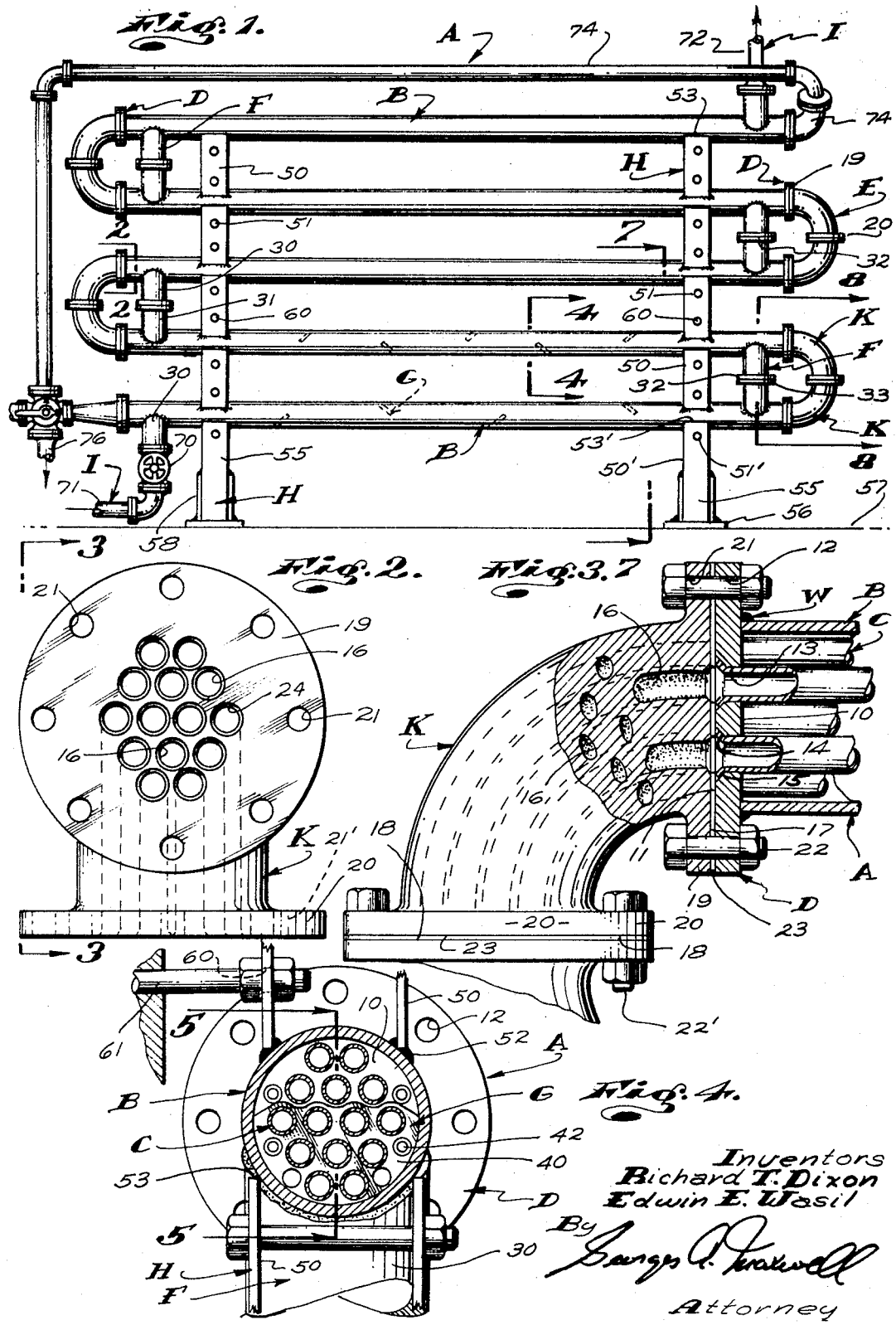

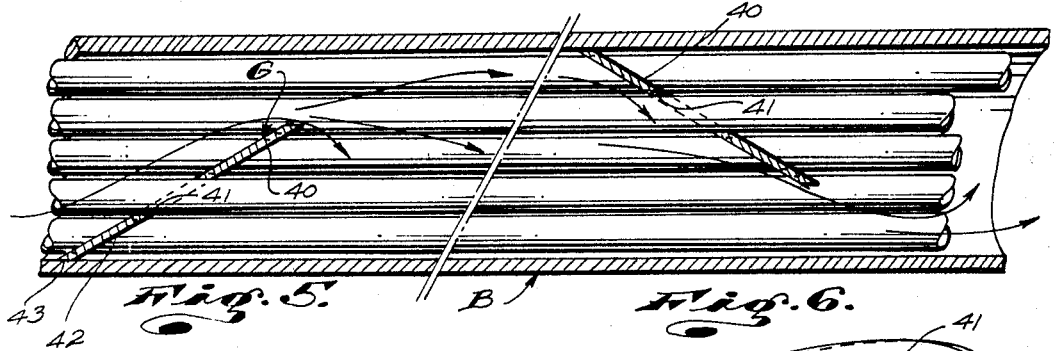
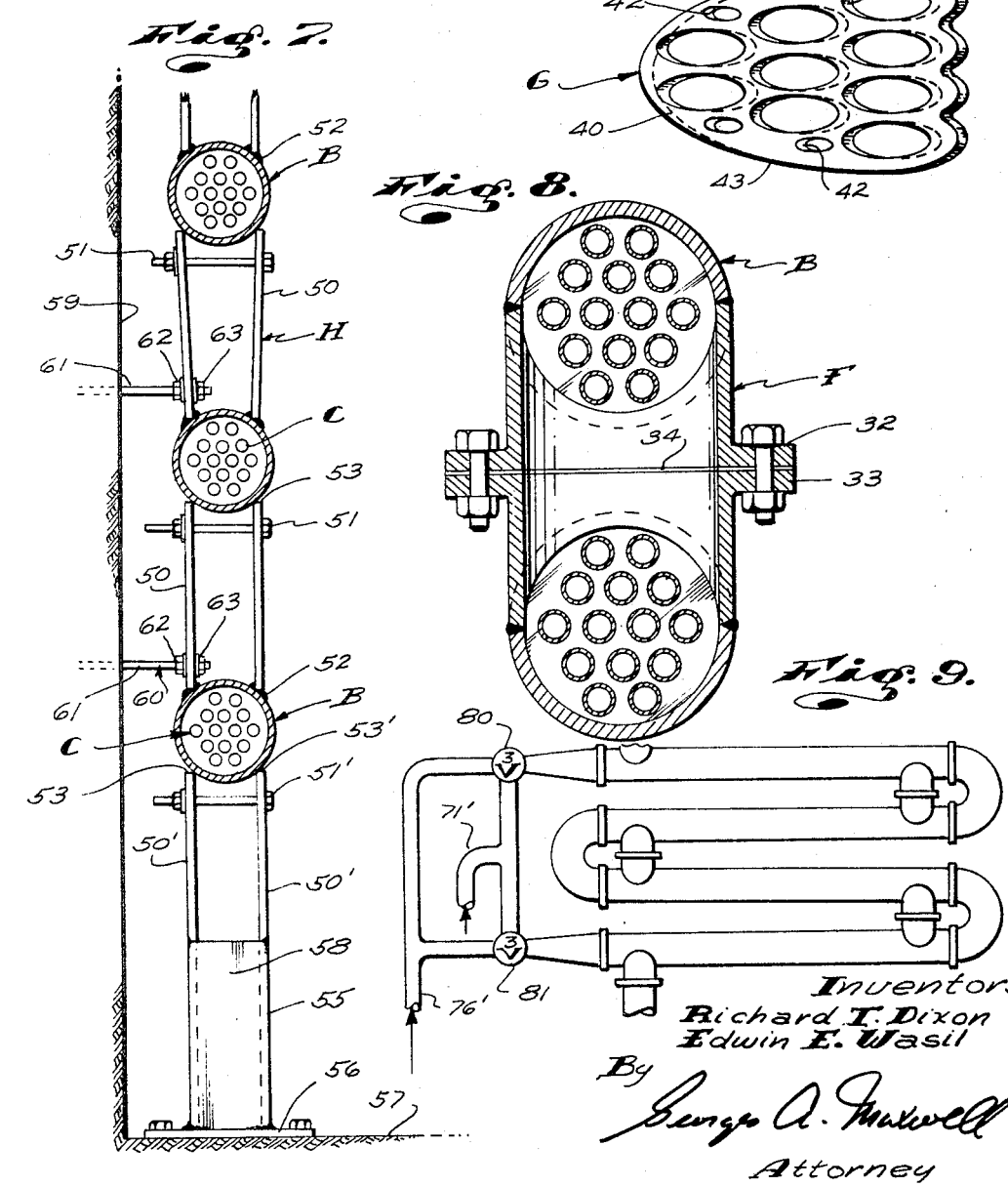

3,439,738
WASTE WATER HEAT EXCHANGER
Richard T. Dixon, Glendale, and Edwin E. Wasil, Palos Verdes Peninsula, Calif. (both % Heat Recovery Manufacturing, Inc., 1625 Naud St., Los Angeles, Calif. 90012)
Filed Oct. 18, 1967, Ser. No. 676,222
Int. Cl. F28f 9/26
U.S. Cl. 165—143     9 Claims

ABSTRACT OF THE DISCLOSURE

A heat exchanger comprising a plurality of elongate, parallel, spaced apart, tubular shells, tube sheets fixed to and closing the ends of the shells, a plurality of flow tubes extending longitudinally through each shell and having longitudinally outwardly opening ends engaged in the carried by the tube sheets, novel connecting means at and between related ends of adjacent shells and establishing communication between related ends of related flow tubes and to connect the flow tubes in the several shells in series, fluid conducting by-pass means between adjacent related ends of adjacent shells and connecting the several shells in series, novel support means in the shells and engaging and supporting the flow tubes in spaced parallel relationship with each other and from the inner surfaces of the shells, novel mounting means between and engaging adjacent shells to maintain the shells in predetermined spaced relationship, fresh water supply and discharge means connected with the opposite ends of the series connected shells and waste water supply and discharge means connected with the opposite ends of the series connected shells.

---

Throughout the arts there are many situations where heater water is employed in carrying out processes and methods of manufacture. Frequently, in such situations, there is a considerable amount of heated waste water, which waste water is conducted into sewers or otherwise disposed of. Still further, the waste water in such situations is frequently ladened with solids, such as fibrous materials.

It has long been recognized and practised that by means of suitable heat exchangers, the supplies of water for carrying out such processes and/or methods can be preheated by transferring heat from the waste waters into the supply of fresh waters. Such transfer of heat results in a material saving in power or fuel required to heat the supply of fresh water and materially reduces the demand on the water heating means, such as boilers, which are required to heat the waters.

In those situations where the waste waters are ladened with foreign matter and heat exchangers are employed, the heat exchangers must be designed so that they will not tend to become plugged with such foreign matter and are normally provided with valving means to effect reversal of flow and for the purpose of back flushing the exchangers to free any foreign matter that might catch in and tend to plug the exchangers. Such reversal of flow or back flushing through heat exchangers, for the purpose set forth above, has long been recognized as standard procedure and means for effecting such a function can and do vary widely in practice.

In order to allow for the free flow of foreign matter carried by waters circulated through heat exchangers, great care is taken to provide constructions having a water course for the water ladened with foreign matter, which is as free as possible of sharp corners, projections and the like in and or on which foreign matter might catch or become lodged. It is of equal importance that the water courses be made as uniform as possible so that the establishment of turbulence and eddies in the waters flowing therethrough and which might cause foreign matter to collect and build up into plugging masses, are maintained at a minimum.

The most common type of heat exchanger presently used in commercial laundries, food processing facilities and the like, adapted to recover heat from waste water and to heat inflowing fresh water involves a plurality of spaced, parallel tubular fluid conducting shells arranged in a row and established of pipe; a plurality of spaced, parallel flow tubes extending longitudinally through each shell with their opposite ends fixed to and supported by tube sheets at the opposite ends of the shells; fresh water water inlet means at one end of the shell occurring at one end of the row of shells; fresh water outlet means at the other end of the shell at the other end of the row of shells; fresh water bypass means between adjacent ends of adjacent shells intermediate the fresh water inlet and outlet means whereby the fresh water flows in a zig-zag or serpentine flow pattern through and between the several shells; waste water cumulators at the said one and the said other ends of the shells occurring at the ends of the rows of shells to connect with related waste pipes and communicating with the flow tubes and connecting means between the adjacent ends of the shells between their said one and other ends not related to the cumulators to establish connection between the related ends of the flow tubes whereby waste waters are circulated in a zig-zag or serpentine manner through and between the flow tubes of the construction.

Ordinarily, the fresh water is circulated in one direction, that is, from one end of the construction to the other, and the waste water is circulated in the opposite direction or from said other end to said one end of the construction and so that a substantially parallel counter flow of fresh and waste water occurs in and through the construction whereby the heat of the hottest waste water is conducted into the hottest (by virtue of previous heat transfer) fresh water.

The connecting means between the ends of the flow tubes of such heat exchangers have been characterized by simple, U-shaped pipes connected between the tube sheets at the related ends of related shells and defining open transfer chambers at and between the said related ends of the flow tubes or the provision of sets of U-shaped intermediate or connecting flow tubes, the ends of which are supported by secondary tube sheets and secured to the tube sheets on the ends of related shells. The first of these connecting means is not desirable as it creates undesirable turbulence and pressure differentials as well as edges, surfaces and corners on or in which the foreign matter carried by the waste water is subject to catching and/or collecting. The second of these connecting means has proven satisfactory from a functional standpoint, but has proven to be extremely costly and complicated to manufacture and is such that it presents a soft, fragile and easy to damage structure.

An object of the present invention is to provide a novel connecting means involving a pair of related, cast elbows releasably secured to each other and each secured to a realted tube sheet at one end of a related shell and having a plurality of flow passages formed therein and communicating with the flow tubes connected with said related tube sheet.

It is an object of the present invention to provide a connecting means of the character referred to which is easy and economical to manufacture, rugged, strong and durable, neat and attractive, and which allows for free, uniform and unobstructed flow of waste water and solids carried by said waste water through it.

In heat exchangers of the character referred to the shells and flow tubes within the shells are of considerable longitudinal extent. Accordingly, it is common practice to provide support means for the flow tubes at spaced points throughout the longitudinal extent of the shells to support said tubes in spaced parallel relationship and to prevent said tubes from sagging and/or bending into engagement with each other and with the interior of the shells in such a manner as to interfere with the free flow of fluid longitudinally through the shells and about the exterior of the flow tubes. Such support means normally involves simple, flat, half-round baffle plates engaged in the shells to extend radially across approximately one-half the interiors of the shells and having spaced apertures therein to slidably receive and support the flow tubes. A plurality of such baffles are provided for each shell and its related set of flow tubes, each being spaced longitudinally of the shell relative to the other and each arranged at the opposite side of the shell relative to each adjacent baffle plate and so that each of the flow tubes is suitably supported.

Due to the fact that the ordinary flow tube supporting baffle plate such as referred to above is radially disposed and normal to the direction of flow of water through the shells, they adversely interfere with the free flow of water through the shells, creating excessive and undesirable turbulence in the water and present obstructions in the shells which tend to catch and hold foreign matter carried by the water.

An object of the present invention is to provide novel support means for the flow tubes which is such that it creates less adverse interference with the free flow of water through the shells and about the flow tubes and directs the flow of water about the flow tubes in a manner to enhance the transfer of heat from the heated waste water in said flow tubes into the fresh water in the shells and about said flow tubes.

In heat exchangers of the general character referred to and to conserve of space, the rows of shells are normally arranged in a vertical plane and are maintained in vertical, spaced, horizontal, parallel relationship by longitudinally spaced, vertically extending metal columns extending between adjacent shells and fixed thereto as by welding. The lowermost shell of said row of shells is supported in spaced relationship above the ground or deck by suitable standards.

With such a relationship of parts it will be apparent that the several shells are permanently fixed together and the overall construction is a large and heavy unit which is such that individual shells with their related flow tubes cannot be removed and worked upon or replaced without cutting and otherwise performing extensive work on the construction.

Further, with such a relationship of parts, the several shells must be carefully and accurately joined together by the welded on columns to assure proper arrangement and alignment of the shells as no adjustment subsequent to assembly of the construction is provided for.

It is an object of the present invention to provide novel means for positioning and maintaining the several shells in proper relationship with each other, which means allows for adjustment of the relative positioning of the shells and which is such that the construction can be easily and conveniently dis-assembled for the purpose of service and/or repair without the necessity of cutting or otherwise mutilating the construction.

The foregoing and other objects and features of our invention will be fully understood from the following detailed description of typical preferred forms and applications of our invention, throughout which description reference is made to the accompanying drawings, in which:

FIG. 1 is an elevational view of the heat exchanger construction that we provide;

FIG. 2 is a view taken substantially as indicated by line 2—2 on FIG. 1;

FIG. 3 is a sectional view taken substantially as indicated by line 3—3 on FIG. 2;

FIG. 4 is a sectional view taken as indicated by line 4—4 on FIG. 1;

FIG. 5 is a view taken as indicated by line 5—5 on FIG. 4;

FIG. 6 is a plan view of a baffle plate as provided by this invention;

FIG. 7 is a view taken substantially as indicated by line 7—7 on FIG. 1;

FIG. 8 is a sectional view taken as indicated by line 8—8 on FIG. 1; and,

FIG. 9 is a diagrammatic view of a modified valving means.

The heater construction A that we provide and which is illustrated in the accompanying drawings includes a plurality of elongate, vertically spaced, horizontal tubular shells B, a plurality of elongate flow tubes C arranged in each shell and extending longitudinally therethrough in lateral spaced, parallel relationship with each other and spaced from the wall of the shell, flat, disc-shaped, flange-like tube sheets D fixed to the opposite ends of each shell and supporting the ends of the flow tubes C, connecting means E fixed to and extending between the tube sheets of related adjacent shells and establishing communication between related ends of related flow tubes, bypass means F establishing communication between the interiors of adjacent shells at related ends thereof, supporting means G within each shell to support the tubes therein, and mounting means H between and supporting the shells in predetermined relationship to each other.

In addition to the foregoing, the construction A is shown as including fresh water supply and discharge means I and waste water supply and discharge means J to direct and control the flow of fresh and waste waters through the construction.

The shells B are established of elongate pipe sections.

The flow tubes C are simple, elongate lengths of boiler tube and are slightly greater in longitudinal extent than the shells B.

In the case illustrated each shell is shown as having fourteen flow tubes arranged within and extending through it.

The tube sheet D at each end of each shell is a round, flat, disc-shaped part established of plate steel and defines flat, axially inwardly and outwardly disposed inner and outer surfaces 10 and 11. Each tube sheet is greater in diametric extent than its related shell and is arranged in axial alignment with its related shell and with its inner surface 10 in flat bearing engagement with the said related end of the shell. The tube sheet is fixed to its related end of the shell by welding W.

The outer peripheral portion of the tube sheet projects radially outward from the shell and is provided with a plurality of circumferentially spaced bolt openings 12 and serves as a mounting flange to facilitate mounting the connecting means E related to said tube sheet, as will hereinafter be described.

The central portion of each tube sheet, overlying its related end of its related shell is provided with a plurality (fourteen) of spaced axially extending openings 13, each of which slidably receives the end portion of a related flow tube C. The outer end of each opening 13 is provided with a countersink 14 and the terminal end of the flow tube engaged through said opening is flared outwardly, as at 15, into the countersink and so that the end of the tube is sealed with and is fixed against axial inward movement in and relative to the plate.

The connecting means E that we provided includes a pair of like cast, right angle elbows K. Each elbow K is provided with a plurality (fourteen) of spaced parallel flow passages 16 extending through it.

The elbows K have flat inner and outer ends 17 and 18 and radially outwardly projecting mounting flanges 19 and 20 at said inner and outer ends. The inner end 17 and its related flange 19 of each elbow K is adapted to be arranged in opposed juxtaposition with a related tube sheet at a related end of a related shell and with the ends of the flow passages in said elbow in alignment with and communicating with the outer open ends of the flow tubes C related to said tube sheet.

The flange 19 of each elbow K is provided with a plurality of circumferentially spaced bolt openings 21 to register with the bolt openings 12 in the related tube sheet.

A plurality of tie bolts 22 are engaged in the registering openings 12 and 21 to hold the elbow K in tight engagement with the tube sheet.

In practice, a suitable gasket 23 is provided between the related surfaces 17 and 11 of the elbows and tube sheets.

Further, in practice and as illustrated in FIGS. 2 and 3 of the drawings, the ends of the flow passages 16 are provided with countersinks 24 to prevent the establishment of sharp corners upon which foreign matter might catch and which might be established by slight misalignment of the flow tubes and flow passages.

The outer surfaces 18 of the flanges 20 of the related elbows K of each connecting means E are similar to the ends 17 and the flanges 19. The surfaces 18 and flanges 20 of the related elbows K are arranged in opposed juxtaposition, with a sealing gasket 23' therebetween, and are held in tight clamped and sealing relationship by tie bolts 22' engaged in and through registering openings 21' in the flanges 20. The flow passages in the related elbows K are in alignment and communicate with each other at the outer surfaces of said elbows.

In practice, the elbows K as set forth above are cast of aluminum or steel and the flow passages 16 therein are established by conventional coring methods. Accordingly, the flow passages may be somewhat rough, porous or grainy. In practice and to smooth the flow passages so that foreign matter will not end to cling or catch thereon, the surfaces thereof, as indicated by stippling in FIG. 3 of the drawings, are coated with a suitable plastic, such as a thermosetting epoxy resin. A plastic is selected which is chemically inert with respect to the material to be handled; which is tough and durable and which has an extremely low coefficient of friction with water. By selecting a plastic coating material having a low coefficient of friction with water, the resulting pressure drop about the end of the connecting means, per lineal measure of flow, can be reduced to an extent that it is substantially equal to the pressure drop, per lineal measure of flow, through the straight flow tubes. Accordingly, the provision of the coating in the flow passages of the connecting means results in a construction wherein the flow of waster water is substantially uniform and even from one end of the construction to the other.

The connecting means E occur between one end of the shell at one end of the row of shells and the adjacent end of the adjacent shell; between the opposite end of said adjacent shell and the adjacent end of the next adjacent shell and continue to extend between and connect adjacent ends of adjacent shells in a like manner so that the waste water is caused to flow longitudinally through the flow tubes and connecting means in a zig-zag or serpentine pattern through the construction.

With the above relationship of parts, it will be apparent that the shells at the ends of the row of shells have free ends not connected by connecting means E. It is these free ends of the end shells which are connected with the waste water supply and discharge means J which will hereinafter be described.

The bypass means F between related ends of adjacent shells includes a downwardly projecting inlet branch pipe 30 fixed to and depending from one end portion of each shell and an upwardly projecting outlet branch pipe 31 at the opposite end portion of each shell. The pipes 30 and 31 are of like predetermined vertical extent and are provided with radially outwardly projecting annular bolt flanges 32 and 33 at their outer free ends.

The pipes 30 and 31 are welded to and are in direct communication with the interiors of their related shells in close proximity to the tube sheets D at their related ends of the shells.

The depending inlet pipe 30 on the shell at one end of the row of shells, hereinafter referred to as the lowermost shell, and the upwardly projecting outlet pipe 31 at one end of the shell at the other end of the row of shells and hereinafter referred to as the upper shell, connect with the fresh water supply and discharge means I, as will hereinafter be described.

The other outlet pipes 31 and inlet pipes 30 between adjacent shells are in axial alignment with each other and are suitably fixed together by bolt fasteners 33 and with a suitable sealing gasket 34 therebetween.

With the above relationship of parts, it will be apparent that the fresh water enters one end of the construction and flows longitudinally through each shell and through the bypass means F from one shell to the other in a zig-zag or serpentine manner through the construction.

The support means G for the flow tubes C include a plurality of longitudinally spaced baffle plates 40 each of which is engaged in its related shell to extend across substantially one-half the interior cross-section of the shell and provided with a plurality of apertures 41 to slidably receive those flow tubes which occur in that portion of the shell through which the plate extends.

Each baffle plate 40 occurs in that half of the shell opposite from the half of the shell in which each adjacent baffle plate occurs, or is positioned in the shell 180° circumferentially of each adjacent baffle plate.

The ordinary baffle plate of the character referred to is a simple, flat, half-round plate with a circular outer peripheral edge which seats on the interior of the shell and has round openings to slidably receive the flow tubes related to it. Such baffle plates occur in radial planes in the shells, normal to the direction of flow and substantially stop the free lineal flow of water through the shells, causing great turbulence in the water as its moves over and/or by the baffles and before it re-establishes free lineal flow. Such baffles create considerable pressure drop and the like through the shells and present obstructions on and about which foreign matter carried by the water tends to catch and/or collect.

In the instant invention, the baffle plates 40 are inclined radially inwardly and longitudinally in the direction of flow of water through the shells so as to present an inclined flow directing surface on their upstream sides. The said flow directing surfaces on the upstream sides of the baffle plates serve to smoothly direct the water by the plates and maintain a far greater free flow of water through the shells with less pressure drop and with superior and more effective distribution of said water about the flow tubes. Further, the inclined baffles 40 do not present structures at their upstream sides which tend to catch or cause foreign matter to collect.

As the water flows by the baffles 40 turbulence is created, but due to the accelerated flow of the water induced by the inclined upstream surfaces of the baffle plates, the pattern of such turbulence is drawn or lengthened longitudinally downstream of the baffle plates and results in a flatter or less acute diagonal flow of water downstream of the baffles and superior or more effective cross or diagonal flow of water about the flow tubes for effecting heat transfer.

The downstream side of the baffles create pockets where minus pressures and considerable turbulence might be created and in which foreign matter might collect.

In addition to the apertures 41 in the baffle plates, the said plates are provided with axially extending bleed openings 42 of limited radial extent and through which water is free to flow, from the upstream to the downstream side of the baffle plates. The water flowing through the openings 42 serves to relieve the back pressure created by the baffle plates, upstream of said plates. The minus pressures generated in the pocket or at the downstream side of the baffle plates draw the water through the openings 42 enhancing the function of reducing the back pressure upstream of the plate. Further, the water flowing downstream through the openings 42, in addition to lengthening the pattern of turbulence downstream of the plates, with attending beneficial effects also establishes a normal downstream flow into and out of the pockets and effectively prevents the collecting of foreign matter in said pockets.

To effect the above combination and relationship of parts, the baffle plates are flat, semi-elliptical plates with the elliptical side edges 43 thereof extending axially and establishing flat bearing engagement with their related portions of the inside surface of the shells. The apertures 41 are elliptical and have axially extending edges to establish flat sliding engagement about the exterior of the flow tubes engaged therethrough. The openings 42 are also preferably elliptical.

In practice, each baffle plate extends across the interior of the shell a sufficient extent so that each baffle plate cooperatively engages and supports certain of the flow tubes engaged and supported by each adjacent baffle plate. This relationship of parts effectively ties the assembly of baffle plates and tubes together whereby proper support for the multiplicity of tubes, in the shells, is provided.

In the case illustrated, each baffle plate engages and supports nine of the fourteen flow tubes.

In the preferred carrying out of the invention, the baffle plates are made of a suitable plastic sheet material, such as Formica, and are established en masse by suitably stacking sheet stock with the several sheets at a predetermined angle to the longitudinal axis of the stack, drilling the apertures and openings axially through the stack and suitably cutting and dressing the exterior of the stack as by means of a lathe and milling machine.

The exact angle at which the baffle plates of the means G are inclined can vary widely and in practice, such angle, for ultimate beneficial effects, is determined by the anticipated volume and rate of flow of water through the construction.

The mounting means H that we provide to support the shells in predetermined spaced relationship to each other includes a plurality of like longitudinally spaced pairs of elongate, laterally spaced legs 50 fixed to and projecting upwardly from each shell (except the uppermost or top shell of the row of shells) and a transversely extending tie bolt means 51 carried by and extending between the upper end portions of the legs of each pair of legs.

The legs 50 are established of strip-like pieces of steel plate occurring in planes parallel with the longitudinal axes of the related shells and have lower horizontal, longitudinally extending edges fixed to their related shells by welding 52 and upper, longitudinally extending edges 53 which are adapted to engage the outside surfaces of the next, upper or adjacent shell, at the lower opposite side portions thereof to support and maintain said next adjacent shell in predetermined spaced relationship above the shell to which the legs are fixed, as clearly illustrated in FIGS. 1, 4 and 7 of the drawings.

The means H further includes a plurality of like longitudinally spaced standards 55 to engage and support the bottom or lowermost shell. Each standard includes a base plate 56 to engage on the deck 57 with which the structure is related, a pair of legs 50' similar to the legs 50 fixed to and extending upwardly from the plate and having upper edges 53' to engage the related shell and bolt means 51'. The legs 50' are somewhat longer than the legs 50 and their lower portions are reinforced by suitable transversely extending plates 58, as illustrated in the drawings. The plates 56 are preferably fixed to the deck.

The construction A is normally arranged in close spaced relationship with a vertical wall structure 59.

The means H, in addition to the foregoing, includes apertures 60 in the lower portion of the legs 50 which occur adjacent that side of the construction opposing the wall 59, threaded studs 61 suitably anchored in the wall and projecting therefrom and through the apertures 60 in the legs and stop and lock nuts 62 and 63 on the studs, occurring at opposite sides of their related legs and serving to hold the construction in fixed relationship to the wall.

If desired, the apertures 60 can be provided in both legs of each pair of legs to facilitate or simplify construction.

In practice, when the construction is assembled and to arrange all parts in proper relationship, compensating for misalignment of deck, wall and the multiplicity of flanged connections, vertical adjustment and horizontal alignment of the several shells is effected by tightening or loosening the bolt means 51 and 51' with resulting lateral inward or outward shifting of the related edges 53 and 53' of the related legs of the means H. It will be apparent that the lateral spacing of the edges 53 and 53' of the legs determines the depth of engagement of the shells therebetween and allows for effective and easy vertical adjustment of the shells for the purpose set forth.

Lateral stability and adjustment of the construction is effected easily and conveniently by the studs 61 and nuts 62 and 63' of the means H. Making up an adjustment of the studs and nuts 62 and 63 of the means H is believed to be so apparent as to not warrant further explanation.

It is to be understood that the studs and nuts referred to above need not be related to each pair of legs, but can be provided sparingly and only where necessary or desired.

The fresh water supply and discharge means I is shown as including an on and off control valve 70 connected with and between the depending inlet pipe 30 on the lowermost shell and a water supply pipe 71 and a water delivery pipe 72 connected with the upwardly projecting flanged outlet pipe on the top or uppermost shell.

The waste water supply and discharge means J is shown as including a flanged reducing sub or nipple 73 fixed to the tube plate at the free end of the lowermost shell, a flanged reducing elbow 74 fixed to the tube plate at the free end of the uppermost or top shell B, a bypass line 74 connected with the elbow 74 and terminating in close proximity to the sub 73, a waste supply pipe 75, a waste delivery pipe 76 and a four-way valve 77 connected with and between the sub 73 and the pipes 74, 75 and 76.

With the means J set forth above, it will be apparent that the waste water can be caused to flow through the heat exchanger construction A in one direction or the other, as desired or as circumstances require. Normally, the waste water is caused to flow in and through the construction in the opposite direction to the direction of flow of fresh water through said construction and its direction of flow is reversed periodically for the purpose of back flushing through the construction and so as to free or release and wash out any foreign matter that may have become caught in the construction.

In practice and if desired the valve 77 can be manually operated, can be automatically operated under control of a time clock or, if desired, can be automatically operated in response to a pressure differential between the normal inlet end and normal outlet end of the construction.

The reducing sub 73 and reducing elbow 74 serve as accumulators at their respective ends of the construction establishing free communication between the means J and the ends of the flow tubes related thereto.

In the form of the invention shown in FIG. 9 of the drawings, a pair of manually operable, two-way valves 80 and 81 are provided at the opposite ends of the exchanger. The valves 80 and 81 are operable to selectively establish communication between the line 71' and the line 76' and so that while flow is always from line 71' and into line 76', the direction of flow through the exchanger is reversible.

Having described only typical preferred forms and applications of our invention, we do not wish to be limited or restricted to the specific details herein set forth, but wish to reserve to ourselves any modifications and/or variations which may appear to those skilled in the art and which fall within the scope of the following claims:

Having described our invention, we claim:

1. A heat exchanger comprising, a plurality of elongate, parallel, spaced apart, tubular shells tube sheets fixed to and closing the ends of the shells, a plurality of flow tubes extending longitudinally through each shell and having longitudinally outwardly opening ends engaged in and carried by the tube sheets, connecting means at at between related ends of adjacent shells and establishing communication between related ends of related flow tubes and to connect the flow tubes in the several shells in series, fluid conducting bypass means between adjacent related ends of adjacent shells and connecting the several shells in series, support means in the shells and engaging and supporting the flow tubes in spaced parallel relationship with each other and from the inner surfaces of the shells, mounting means between and engaging adjacent shells to maintain the shells in predetermined spaced relationship, fresh water supply and discharge means connect with the opposite ends of the series connected shells and waste water supply and discharge means connected with the opposite ends of the series connected shells, said connecting means between each of said related ends of adjacent shells including a pair of cast elbows with a plurality of parallel flow passages extending therethrough and connected together and with the tube sheets at the related ends of the shells with related flow passages in register with each other and with related ends of related flow tubes, the inside diameter of the flow tubes and flow passages being equal.

2. A structure as set forth in claim 1 wherein the surfaces of the flow passages in the connecting means are coated with a plastic having a smooth surface and a lower coefficient of friction with water than the material from which the elbows are cast and the material from which the flow tubes are established whereby foreign matter carried by the waste water will not catch and collect on said surfaces and the friction loss of waste water flowing through the connecting means does not materially affect the free and uniform flow of water through the several series connected flow tubes.

3. A structure as set forth in claim 1 wherein the tube sheets have flat axially outwardly disposed outer surfaces and have peripheral flange portions with spaced bolt openings projecting radially outwardly from the shells, said elbows of the connecting means having flat, axially inwardly disposed inner end surfaces opposing the outer surfaces of their related tube sheets, radially outwardly extending inner end flanges with spaced bolt openings adjacent the flange portions of their related tube sheets, flat laterally disposed outer end surfaces opposing the said outer end surface of related adjacent elbows and annular outer end flanges with spaced bolt openings adjacent the annular outer flange of the related adjacent elbows, sealing gaskets between the openings in the adjacent flanges and holding the surfaces and gaskets in tight sealing engagement with each other.

4. A structure as set forth in claim 1 wherein the tube sheets have flat axially outwardly disposed outer surfaces and have peripheral flange portions with spaced bolt openings projecting radially outwardly from the shells, said elbows of the connecting means having flat, axially inwardly disposed inner end surfaces opposing the outer surfaces of their related tube sheets, radially outwardly extending inner end flanges with spaced bolt openings adjacent the flange portions of their related tube sheets, flat laterally disposed outer end surfaces opposing the said outer end surface of related adjacent elbows and annular outer end flanges with spaced bolt openings adjacent the annular outer flange of the related adjacent elbows, sealing gaskets between the openings in the adjacent flanges and holding the surfaces and gaskets in tight sealing engagement with each other, the open ends of the flow tubes being flared radially outwardly to define outwardly and radially inwardly inclined surfaces in the terminal end portion of the flow tubes, an the ends of the flow passages having countersinks at their opposite ends defining radially inwardly and outwardly surfaces, said inclined surfaces serving to relieve corners and edges which might otherwise occur as a result of misalignment of the related ends of related flow passages and flow tubes and on which foreign matter carried by the water flowing therethrough might catch.

5. A structure as set forth in claim 1 wherein said support means includes a plurality of semi-elliptical baffle plates arranged in longitudinally spaced relationship in each shell and inclined radially and longitudinally in the direction of flow through said tubes and having axially extending elliptical openings to slidably receive and support a number of flow tubes greater than one-half the total number of tubes in each shell and having axially extending fluid conducting openings establishing communication between the upstream and downstream sides thereof, each plate seated in and about a portion of the inside surface of its related shell and each plate being arranged to occur at diametrically opposite sides of its related shell from each adjacent plate therein.

6. A structure as set forth in claim 1 wherein the surfaces of the flow passages in the connecting means are coated with a plastic having a smooth surface and a lower coefficient of friction with water than the material from which the elbows are cast and the material from which the flow tubes are established whereby foreign matter carried by the waste water will not catch and collect on said surfaces and the friction loss of waste water flowing through the connecting means does not materially affect the free and uniform flow of water through the several series connected flow tubes, said support means including a plurality of semi-elliptical baffle plates arranged in longitudinally spaced relationship in each shell and inclined radially and longitudinally in the direction of flow through said tubes and having axially extending elliptical openings to slidably receive and support a number of flow tubes greater than one-half the total number of tubes in each shell and having axially extending fluid conducting openings establishing communication between the upstream and downstream sides thereof, each plate seated in and about a portion of the inside surface of its related shell and each plate being arranged to occur at diametrically opposite sides of its related shell from each adjacent plate therein.

7. A structure as set forth in claim 1 wherein the tube sheets have flat axially outwardly disposed outer surfaces and have peripheral flange portions with spaced bolt openings projecting radially outwardly from the shells, said elbows of the connecting means having flat, axially inwardly disposed inner end surfaces opposing the outer surfaces of their related tube sheets, radially outwardly extending inner end flanges with spaced bolt openings adjacent the flange portions of their related tube sheets, flat laterally disposed outer end surfaces opposing the said outer end surface of related adjacent elbows and annular outer end flanges with spaced bolt openings adjacent the annular outer flange of the related adjacent elbows, sealing gaskets between the openings in the adjacent flanges and holding the surfaces and gaskets in tight sealing engagement with each other, the open ends of the flow tubes being flared radially outwardly to define outwardly and radially inwardly inclined surfaces in the terminal end portions of the flow tubes, the ends of the flow passages having countersinks at their opposite ends defining radially inwardly and outwardly surfaces, said inclined surfaces serving to relieve corners and edges which might otherwise occur as a result of misalignment of the related ends of related flow passages and flow tubes and on which foreign matter carried by the water flowing therethrough might catch, said support means including a plurality of semi-elliptical baffle plates arranged in longitudinally spaced relationship in each shell and inclined radially and longitudinally in the direction of flow through said tubes and having axially extending elliptical openings to slidably receive and support a number of flow tubes greater than one-half the total number of tubes in each shell and having axially extending fluid conducting openings establishing communication between the upstream and downstream sides thereof, each plate seated in and about a portion of the inside surface of its related shell and each plate being arranged to occur at diametrically opposite sides of its related shell from each adjacent plate therein.

8. A structure as set forth in claim 1 wherein the tube sheets have flat axially outwardly disposed outer surfaces and have peripheral flange portions with spaced bolt openings projecting radially outwardly from the shells, said elbows of the connecting means having flat, axially inwardly disposed inner end surfaces opposing the outer surfaces of their related tube sheets, radially outwardly extending inner end flanges with spaced bolt openings adjacent the flange portions of their related tube sheets, flat laterally disposed outer end surfaces opposing the said outer end surfaces of related adjacent elbows and annular outer end flanges with spaced bolt openings adjacent the annular outer flange of the related adjacent elbows, sealing gaskets between the openings in the adjacent flanges and holding the surfaces and gaskets in tight sealing engagement with each other, said plurality of shells being arranged in vertical spaced relationship above a deck, said mounting means including longitudinally spaced standards fixed to the deck and having laterally spaced, upwardly projecting legs with spaced shell engaging upper ends engaging the lower opposite sides of the lowermost shell, and a bolt means between the upper end portions of the legs of each standard and below said shell, longitudinally spaced pair of laterally spaced legs fixed to and projecting upwardly from each shell except the uppermost shell with spaced shell engaging upper ends engaging the lower opposite side of the next upper shell and bolt means between the upper end portions of the legs of each pair of legs and below the related next upper shells, said bolt means adapted to vary the lateral spacing of the shell engaging ends of related legs so as to vary the vertical depth of engagement of the shells therebetween whereby the several parts of the construction and the flanged connection therebetween can be aligned.

9. A structure as set forth in claim 1 wherein the tube sheets have flat axially outwardly disposed outer surfaces and have peripheral flange portions with spaced bolt openings projecting radially outwardly from the shells, said elbows of the connecting means having flat, axially inwardly disposed inner end surfaces opposing the outer surfaces of their related tube sheets, radially outwardly extending inner end flanges with spaced bolt openings adjacent the flange portions of their related tube sheets, flat laterally disposed outer end surfaces opposing the said outer end surfaces of related adjacent elbows and annular outer end flanges with spaced bolt openings adjacent flanges and holding the surfaces and gaskets in elbows, sealing gaskets between the openings in the adjacent flanges and holding the surfaces nad gaskets in tight sealing engagement with each other, said plurality of shells being arranged in vertical spaced relationship above a deck and adjacent a wall, said mounting means including longitudinally spaced standards fixed to the deck and having laterally spaced, upwardly projecting legs with spaced shell engaging upper ends engaging the lower opposite sides of the lowermost shell, and a bolt means between the upper end portions of the legs of each standard and below said shell, longitudinally spaced pair of laterally spaced legs fixed to and projecting upwardly from each shell except the uppermost shell with spaced shell engaging upper ends engaging the lower opposite sides of the next upper shell and bolt means between the upper end portions of the legs of each pair of legs and below the related next upper shells, said bolt means adapted to vary the lateral spacing of the shell engaging ends of related legs so as to vary the vertical depth of engagement of the shells therebetween whereby the several parts of the construction and the flanged connection therebetween can be aligned, and threaded studs anchored in said wall and projecting outwardly therefrom in axial alignment with and through the openings in adjacent related legs on the shells and stop and lock nuts on the studs and opposite sides of their related legs and adapted to be moved thereon to adjust and maintain the shells in proper vertical planes.

References Cited

UNITED STATES PATENTS

| | | | |
|---|---|---|---|
| 2,099,493 | 11/1937 | Mahoney | 165—143 |
| 2,651,508 | 9/1953 | Bready | 165—143 X |
| 2,693,942 | 11/1954 | Guala | 165—159 X |
| 2,811,336 | 10/1957 | Bready | 165—143 X |
| 3,048,372 | 8/1962 | Newton | 165—143 X |

ROBERT A. O'LEARY, *Primary Examiner.*

ALBERT W. DAVIS, JR., *Assistant Examiner.*

U.S. Cl. X.R.

165—159, 178, 68, 97, 133; 285—137, 179; 138—115